US007003580B1

(12) United States Patent
Cook

(10) Patent No.: US 7,003,580 B1
(45) Date of Patent: Feb. 21, 2006

(54) BANDWIDTH BOOST USING A WIRELESS COMMUNICATION PATH

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 972 days.

(21) Appl. No.: 09/752,210

(22) Filed: Dec. 29, 2000

(51) Int. Cl.
  *G06F 15/16* (2006.01)
(52) U.S. Cl. ...................................... 709/235; 709/227
(58) Field of Classification Search ............... 375/240, 375/219; 370/477, 543, 347, 336; 709/225, 709/226, 232, 238, 239, 240, 231, 236, 227; 455/406
  See application file for complete search history.

(56) References Cited

U.S. PATENT DOCUMENTS

| | | | |
|---|---|---|---|
| 5,583,869 A * | 12/1996 | Grube et al. ................. | 370/347 |
| 5,742,527 A | 4/1998 | Rybicki et al. | |
| 5,751,701 A | 5/1998 | Langberg et al. | |
| 5,781,728 A | 7/1998 | Rybicki et al. | |
| 5,930,340 A | 7/1999 | Bell | |
| 5,946,633 A * | 8/1999 | McAlinden ................. | 370/477 |
| 6,167,034 A | 12/2000 | Langberg et al. | |
| 6,240,462 B1 * | 5/2001 | Agraharam et al. ........ | 709/238 |
| 6,615,034 B1 * | 9/2003 | Alloune et al. ............. | 455/406 |
| 6,657,982 B1 * | 12/2003 | Fong et al. .................. | 370/336 |
| 6,671,741 B1 * | 12/2003 | Dillon ......................... | 709/250 |
| 6,731,678 B1 * | 5/2004 | White et al. ................. | 375/219 |
| 6,769,028 B1 * | 7/2004 | Sass et al. ................... | 709/231 |

OTHER PUBLICATIONS

Chen, Walter Y., "DSL Simulation Techniques and Standards Development For Digital Subscriber Line Systems" Part I, Chapter 5 Channel Capacity and Part IIChapter 13 ADSL (Asymmetrical Digital Subscriber Lines); MacMillan Technical Publishing, 1998.
Coombs, Clyde F., Jr., Communications Network Test & Measurement Handbook, McGraw-Hill 1998, pp. 420-476.
ANSI T1.413-1998 American National Standard for Telecommunications—Network and Customer Installation Interfaces—Asymmetric Digital Subscriber Line (ADSL) Metallic Interface, New York.
The ATM Forum Technical Committee, Inverse Multiplexing for ATM (IMA) Specification Version 1.1, AF-PHY-0086.001, Mar., 1999.

* cited by examiner

*Primary Examiner*—Paul H. Kang

(57) ABSTRACT

A bandwidth boost system is disclosed that increases the bandwidth to a client by transmitting data over both a wireline communication path and a wireless communication path. A control system receives a request from the client over the wireline communication path for a first and second data set. The control system processes the request to generate first and second transmit instructions. The control system transfers the first data set and the first transmit instructions to a wireline transfer system and transfers the second data set and the second transmit instructions to a wireless transfer system. The wireline transfer system transmits the first data set to the client over the wireline communication path. The wireless transfer system establishes the wireless communication path with the client and transfers the second data set to the client over the wireless communication path.

18 Claims, 4 Drawing Sheets

BANDWIDTH BOOST USING A WIRELESS COMMUNICATION PATH

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to providing a bandwidth boost to a client using a wireless communication path.

2. Description of the Prior Art

Internet clients establish communication paths with service providers to gain access to the Internet. The communication paths can be made up of different types of physical media, such as a wire, fiber optic cables, or air (for wireless). The service provider transmits data over the communication path to the client at a particular bandwidth. The bandwidth over any single communication path is unfortunately limited by the physical media making up the communication path, the client's interface with the communication path, such as a modem, and other factors.

A client can receive the data at a higher bandwidth by establishing multiple communication paths with the service provider. The service provider disassembles the data and transmits segments of the data over the multiple communication paths. The client reassembles the segments of data that were received over the multiple communication paths using conventional techniques. Unfortunately, the multiple communication paths should ideally be of the same media type to allow for easier reassembly of the segments of data. In some situations, that could mean installing three or more phone lines into a building in order to get the increased bandwidth. If the communication paths are not of the same media type, the client may have a more difficult time reassembling the segments of data.

SUMMARY OF THE INVENTION

The invention helps to solve the above problems with a bandwidth boost system that increases the bandwidth to a client by transmitting data sets over both a wireless communication path and a wireline communication path. The bandwidth boost system can advantageously give a client a bandwidth boost without the client having to install multiple wireline communication paths. The wireline communication paths can be expensive and the bandwidth boost system could save the client money. The bandwidth boost system transfers data sets over two different types of physical media but does not disassemble an individual data set and transfer segments of the individual data set over both types of media. Thus, the bandwidth boost system avoids the problems of reassembling the data sets because it transfers individual data sets over only one media type.

The bandwidth boost system comprises a wireline transfer system, a wireless transfer system, and a control system. A client transmits a request for a first data set and a second data set to the bandwidth boost system. The request could also ask for a bandwidth boost. The control system receives the request over a wireline communication path. The control system processes the request to generate first transmit instructions and second transmit instructions. In some examples, the control system retrieves the first data set and the second data set from a network such as the Internet. The control system transfers the first data set and the first transmit instructions to the wireline transfer system. The control system transfers the second data set and the second transmit instructions to the wireless transfer system.

The wireline transfer system transmits the first data set to the client over the wireline communication path based on the first transmit instructions. The wireless transfer system establishes a wireless communication path with the client based on the second transmit instructions. The wireless transfer system then transmits the second data set to the client over the wireless communication path based on the second transmit instructions.

DETAILED DESCRIPTION OF THE INVENTION

Figure 1:
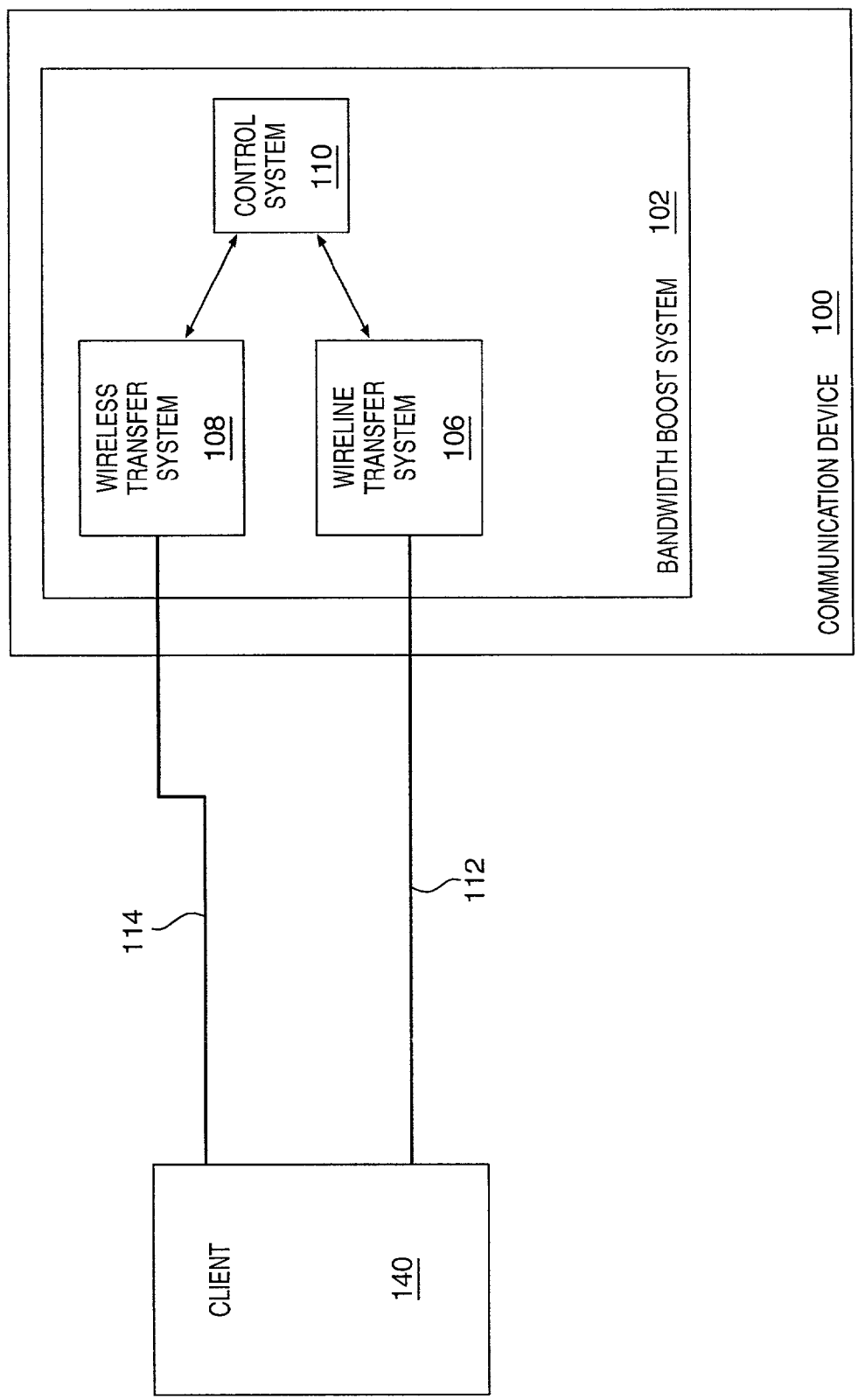
FIG. 1 is a block diagram that illustrates a bandwidth boost system in an example of the invention.
Figure 2:
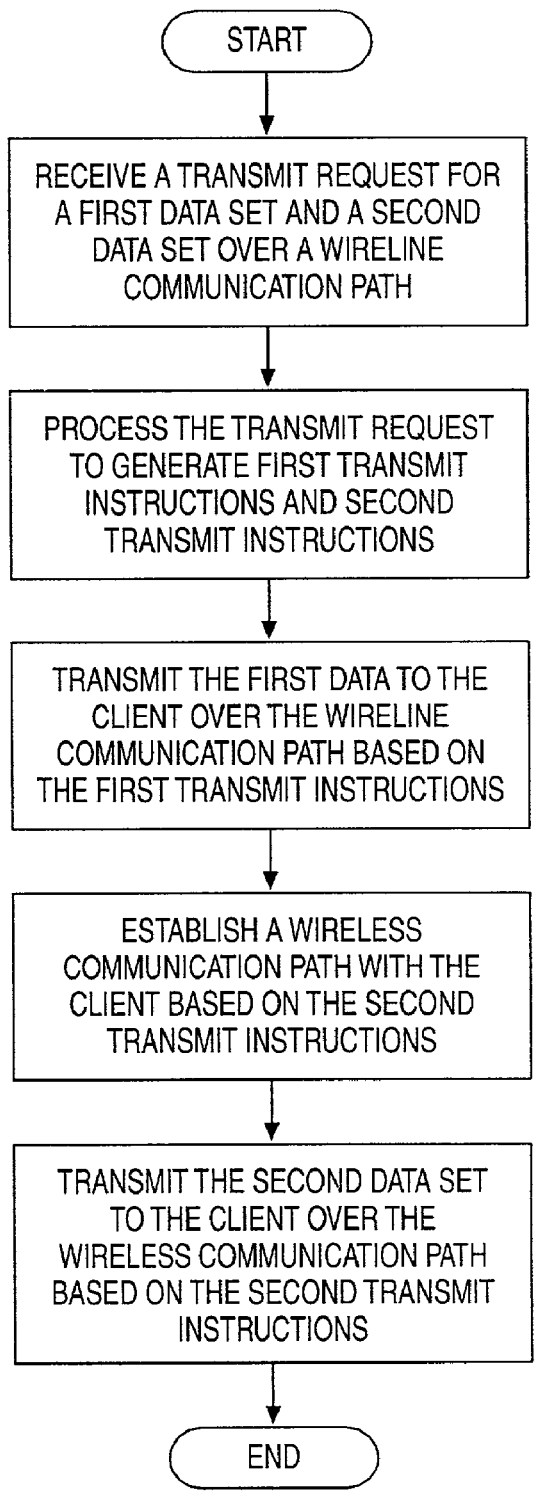
FIG. 2 is a flow diagram that illustrates an operation of a bandwidth boost system in an example of the invention.

Bandwidth Boost System—FIGS. 1–2

FIGS. 1–2 depict an example of a bandwidth boost system in accord with the present invention. Those skilled in the art will appreciate numerous variations from this example that does not depart from the scope of the invention. Those skilled in the art will also appreciate that various features described could be combined with other embodiments to form multiple variations of the invention. Those skilled in the art will appreciate that some conventional aspects of the bandwidth boost system have been simplified or omitted for clarity.

FIG. 1 shows a block diagram illustrating an example of a bandwidth boost system 102 within a communication device 100. Bandwidth boost system 102 comprises wireline transfer system 106, wireless transfer system 108, and control system 110. Wireline transfer system 106 is configured to communicate with a client 140 over a wireline communication path 112. Wireless transfer system 108 is configured to communicate with client 140 over a wireless communication path 114. Control system 110 is coupled to wireline transfer system 106 and wireless transfer system 108.

A wireline communication path 112 refers to a communication path comprised of any type of physical media except for air. A wireless communication path 114 refers to a communication path that at least includes air as a physical media.

FIG. 2 shows a flow diagram illustrating an exemplary operation of bandwidth boost system 102. Wireline transfer system 106 receives a transmit request, from client 140 over wireline communication path 112, for a first data set and a second data set. Those skilled in the art will appreciate that first data set and the second data set could each comprise a series of data sets. Wireline transfer system 106 transfers the transmit request to control system 110. Control system 110 processes the transmit request to generate first transmit instructions and second transmit instructions. The first transmit instructions control transmission of the first data set. The second transmit instructions control transmission of the second data set. Control system 110 transfers the first data set and the first transmit instructions to wireline transfer system 106. Control system 110 transfers the second data set and the second transmit instructions to wireless transfer system 108.

Wireline transfer system 106 receives a first data set and the first transmit instructions from control system 110. Wireline transfer system 106 transmits the first data set to client 140 over wireline communication path 112 based on the first transmit instructions.

Wireless transfer system 108 receives the second data set and the second transmit instructions from control system 110. Wireless transfer system 108 establishes wireless communication path 114 with client 140 based on the second transmit instructions. Wireless transfer system 108 transmits the second data set to client 140 over wireless communication path 114 based on the second transmit instructions. In some examples, wireline transfer system 106 transmits the first data set to client 140 concurrently as wireless transfer system 108 transmits the second data set to client 140.

Figure 3:
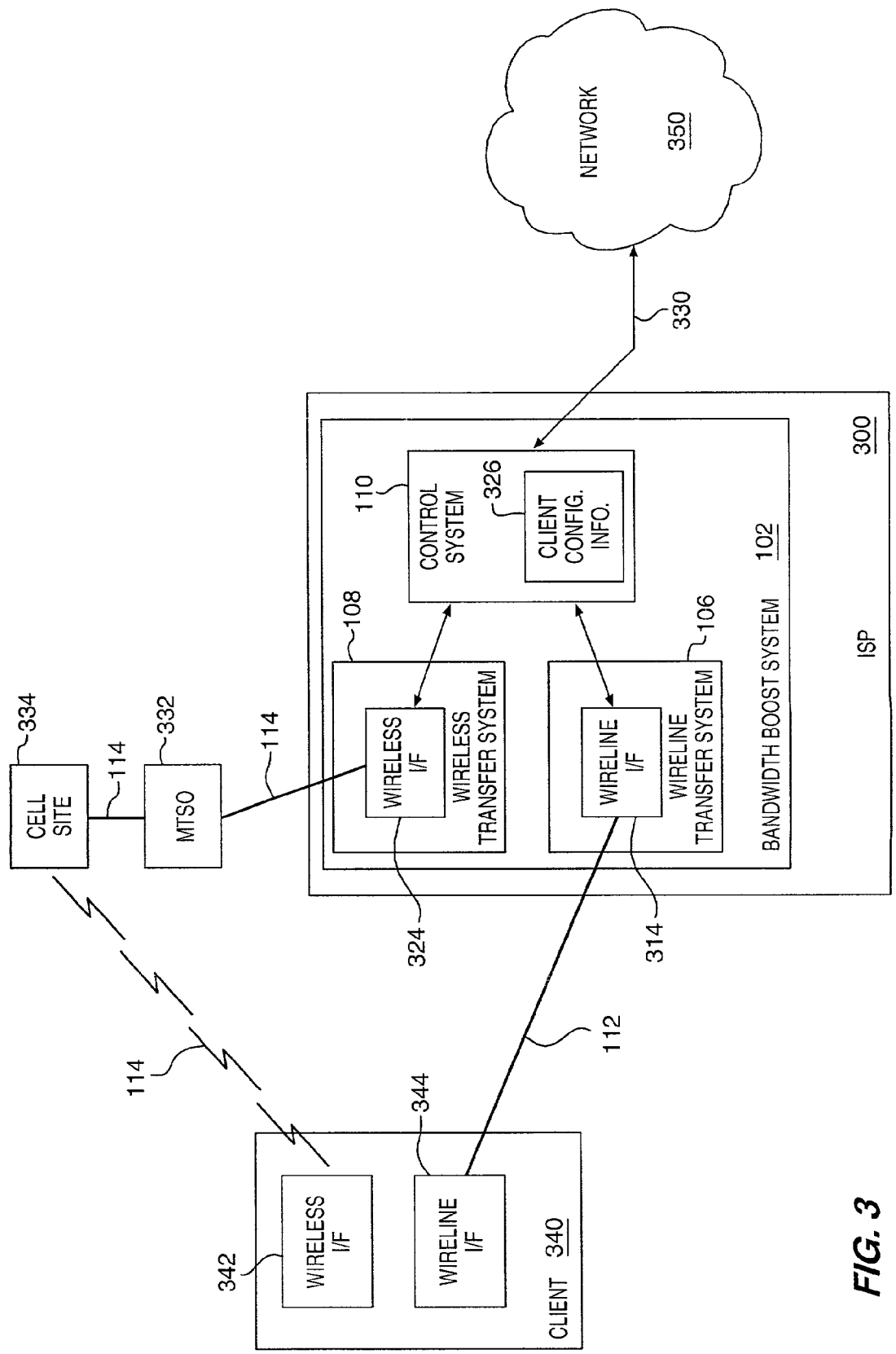
FIG. 3 is a block diagram that illustrates a bandwidth boost system used by an Internet Service Provider in an example of the invention.
Figure 4:
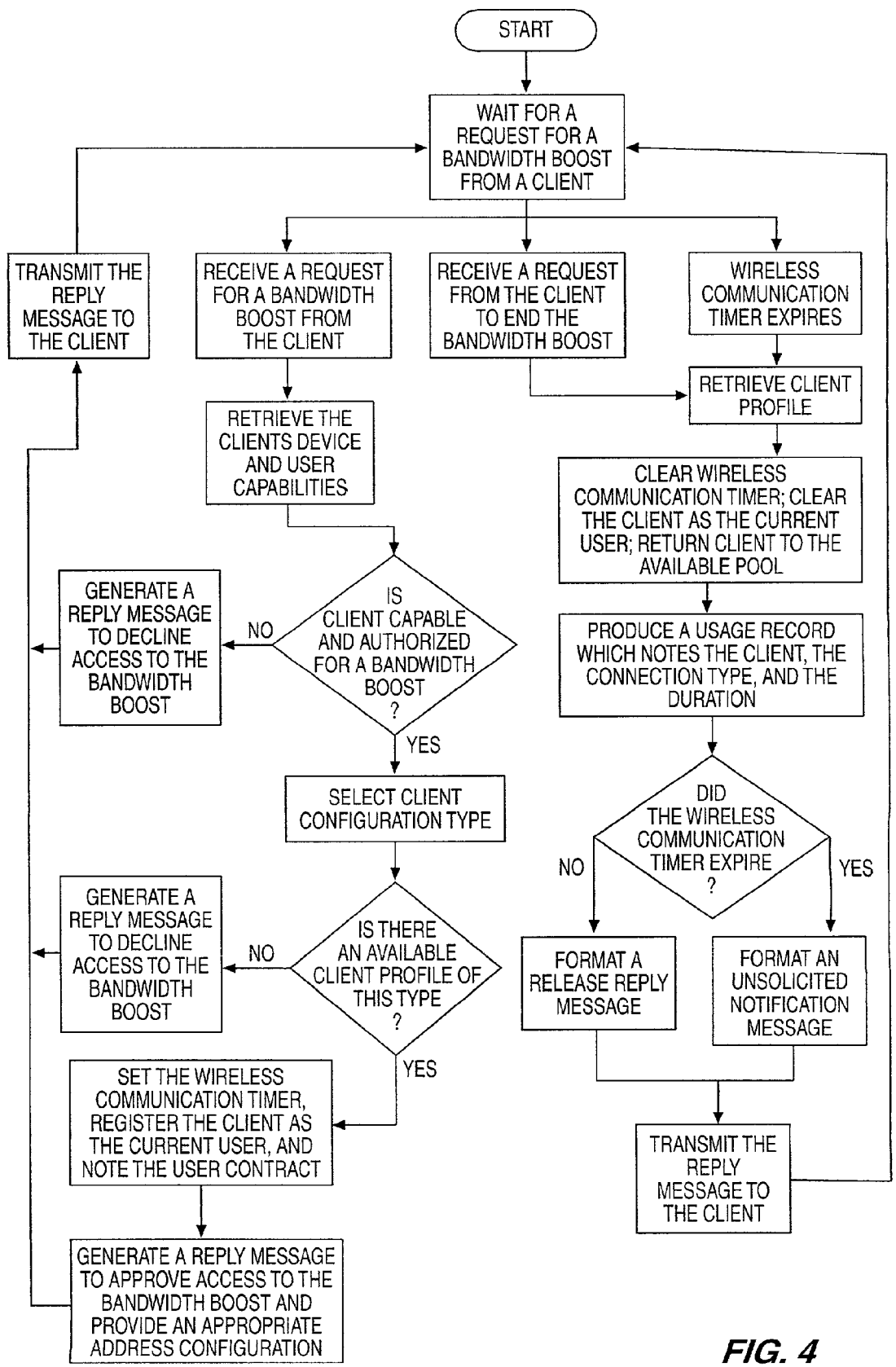
FIG. 4 is a flow diagram that illustrates an operation of a bandwidth boost system used by an Internet Service Provider in an example of the invention.

Bandwidth Boost System for an Internet Service Provider—FIGS. 3–4

FIGS. 3–4 depict an example of a bandwidth boost system for an Internet Service Provider (ISP) in accord with the present invention. Those skilled in the art will appreciate numerous variations from this example that does not depart from the scope of the invention. Those skilled in the art will also appreciate that various features described could be combined with other embodiments to form multiple variations of the invention. Those skilled in the art will appreciate that some conventional aspects of the bandwidth boost system have been simplified or omitted for clarity.

FIG. 3 shows a block diagram illustrating an example of bandwidth boost system 102 used by an Internet Service Provider (ISP) 300. ISP 300 is any system that connects a client to the Internet. Bandwidth boost system 102 is configured to communicate with client 340 and network 350. Bandwidth boost system 102 comprises wireline transfer system 106, wireless transfer system 108, and control system 110. Wireline transfer system 106 includes wireline interface 314. Wireless transfer system 108 comprises wireless interface 324. Control system 110 includes client configuration information 326.

Client 340 comprises wireline interface 344 and wireless interface 342. Wireline interface 314 is configured to communicate with wireline interface 344 over wireline communication path 112. Wireless interface 324 is configured to communicate with wireless interface 342 over wireless communication path 114. Client 340 could be any communication device, such as a computer.

Wireless communication path 114 could be facilitated through a Mobile Telephone Switching Office (MTSO) 332 and a cell site 334, which is shown in FIG. 3. In such a case, wireless interface 324 is configured to communicate with Mobile Telephone Switching Office (MTSO) 332. MTSO 332 is configured to communicate with cell site 334. Cell site 334 is configured to communicate with wireless interface 342.

Those skilled in the art will appreciate that wireless communication path 114 could also be facilitated with a Multichannel Multipoint Distribution Service (MMDS) system (not shown). In such a case, wireless interface 324 is configured to communicate with the MMDS system and the MMDS system is configured to communicate with wireless interface 342.

In operation, client 340 transfers an access request to ISP 300 over wireline communication path 112. Control system 110 receives the access request through wireline interface 314. Control system 110 processes the access request to determine if client 340 is authorized for access. If so, control system 110 grants client 340 access to ISP 300 for communication with network 350. Those skilled in the art will appreciate that some conventional aspects of acquiring access to an ISP have been omitted for the sake of brevity.

Under normal operation, client 340 communicates with ISP 300 using communication path 112. However, situations may arise where client 340 needs or wants a higher bandwidth connection with ISP 300. If client 340 wants to retrieve a first data set and a second data set from network 350, then client 340 transfers a transmit request to control system 110 over wireline communication path 112. Control system 110 receives the transmit request through wireline interface 314 and wireline communication path 112. Control system 110 processes the transmit request to generate a data request for the first data set and the second data set. Control system 110 transmits the data request to network 350 over path 330. For example, network 350 is the Internet. Control system 110 then receives the first data set and the second data set from network 350 in response to the data request. Those skilled in the art will appreciate that ISP 300 could also store the first data set and the second data set. In such a case, control system 110 would not have to generate the data request.

Client 340 also requests the bandwidth boost in the transmit request. The bandwidth boost provides a higher bandwidth to client 340 than is provided by communication path 112 alone. FIG. 4 illustrates a flow diagram that depicts an example of an operation of bandwidth boost system 102 to provide the bandwidth boost to client 340. Control system 110 waits for the request for the bandwidth boost. If control system 110 receives the request for the bandwidth boost through wireline interface 314, then control system 110 retrieves configuration information 326 about client 340. The client configuration information 326 includes authorization information for client 340, information on the type of wireless interface 342 within client 340, and the capabilities of the wireless interface 342 within client 340. If client 340 is not authorized and/or capable of communicating with wireless transfer system 108 through wireless interface 324, then control system 110 generates a reply message that denies client 340 the bandwidth boost. Control system 110 transmits the reply message to client 340 over wireline communication path 112 using wireline transfer system 106.

If client 340 is authorized and capable of communicating with wireless transfer system 108 through wireless interface 324, then control system 110 selects a client configuration type. Client configuration types include terminal identifiers, frequency ranges, wireless communication type, power-on control sequences for transceiver initialization, encryption types, security certificates, and other information. If control system 110 finds the appropriate configuration type, then control system 110 sets a wireless communication timer. The wireless communication timer keeps track of the amount of time client 340 receives the bandwidth boost. Control system 110 also registers client 340 as the current user of wireless interface 324. Control system 110 then generates a reply message that grants client 340 access to the bandwidth boost and provides client 340 an appropriate address configuration. Control system 110 transmits the reply message to client 340 over wireline communication path 112 using wireline interface 314. Client 340 configures wireless interface 342 to communicate with wireless transfer system 108 through wireless interface 324. When wireless interface 342 is configured, wireless transfer system 108 establishes wireless communication path 114.

With wireless communication path 114 established, control system 110 processes the transmit request to generate first transmit instructions and second transmit instructions. The first transmit instructions control transmission of the first data set. The second transmit instructions control transmission of the second data set. When processing the transmit request, control system 110 selects which communication path 112, 114 that the first data set and the second data set should be transmitted over. Control system 110 could select the communication path 112, 114 for a data set based on the quality of service of the communication path 112, 114 and the quality of service suggested for a particular data set. Control system 110 could also select the communication path 112, 114 based on the size of the data sets. For example, large data sets could be transmitted over a dedicated wireless communication path with a high bandwidth.

Control system 110 could look at headers in packets or some other information to select the appropriate communication path 112, 114 to route the data sets. For example, if network 350 implements Multiprotocol Label Switching (MPLS), then packets coming from the network 350 contain labels that indicate the type of data in the packets. For instance, a label could indicate that a packet contains video data. Control system 110 could look at the labels and route the data sets over the appropriate communication path 112, 114 based on the labels.

Control system 110 transmits the first data set and the first transmit instructions to the wireline transfer system 106. Control system 110 transmits the second data set and the second transmit instructions to the wireless transfer system 108.

Wireline transfer system 106 receives the first data set and the first transmit instructions from control system 110. Wireline interface 314 transmits the first data set to client 340 over wireline communication path 112 based on the first transmit instructions.

Wireless transfer system 108 receives the second data set and the second transmit instructions from control system 110. Wireless interface 324 transmits the second data set to client 340 over wireless communication path 114 based on the second transmit instructions. Those skilled in the art will appreciate that the second data set could represent a timed connection. Thus, client 340 would have access to ISP 300 over wireless communication path 114 for a time period, during which time data could be transmitted over wireless communication path 114 and command information could be transmitted over wireline communication path 112.

In this example, MTSO 332 and cell site 334 facilitate wireless communication path 114. Wireless interface 324 transmits the second data set to MTSO 332. MTSO 332 transmits the second data set to cell site 334. Cell site 334 is a transmitter/receiver location that is controlled by a Wireless Service Provider (WSP). Cell site 334 generates a wireless signal and transmits the second data set over the wireless signal. Wireless interface 342 receives the wireless signal including the second data set.

Wireless interface 324 transmits the second data set over wireless communication path 114 until control system 110 receives a request from client 340 to end the bandwidth boost or until the wireless communication timer expires. In either event, control system 110 retrieves the profile for client 340. Control system 110 clears the wireless communication timer. Control system 110 also clears client 340 as the current recipient of the bandwidth boost and returns client 340 to the pool of available users. Control system 110 maintains the pool of available users in order to share access to wireless communication path 114 among different clients at different times. Control system 110 then generates a usage record that documents which client got the bandwidth boost, what type of connection was established for the bandwidth boost, and the duration of the bandwidth boost.

Control system 110 generates billing records of the transmissions over both communication paths 112, 114. Control system 110 uses the usage record to monitor use of wireless communication path 114. Communication paths 112, 114 could be billed at different rates, so control system 110 monitors the time that each communication path 112, 114 is transmitting. Control system 110 could provide billing records to MTSO 332 for wireless billing.

Control system 110 generates a reply message that informs client 340 that the bandwidth boost has ended. Control system 110 transmits the reply message to client 340 over wireline communication path 112 using wireline interface 314. If the bandwidth boost ended because the wireless communication timer expired, then the reply message informs client 340 of that. If the bandwidth boost ended because client 340 requested that the bandwidth boost end, then the reply message that acknowledges the bandwidth boost has ended.

Bandwidth boost system 102 advantageously provides an on-demand bandwidth boost for a client. For example, client 340 could request that bandwidth boost system 102 transmit a streaming video, an Internet radio feed, or a similar data set over wireless communication path 114. In such a situation, client 340 can still use wireline communication path 112 for command information and for other data sets. The two available communication paths 112 and 114 increase the available bandwidth to client 340. Client 340 may request the bandwidth boost for data set transfers that do not require a high quality transmission because of the lower reliability of wireless communications. Client 340 may also request the bandwidth boost based on a cost comparison for using wireline communication path 112 versus wireless communication path 114.

Those skilled in the art will appreciate variations of the above-described embodiments that fall within the scope of the invention. As a result, the invention is not limited to the specific examples and illustrations discussed above, but only by the following claims and their equivalents.

I claim:

1. A method of operating a bandwidth boost system for use in a communication device, the method comprising:
receiving a transmit request from a client over a wireline communication path for a first data set and a second data set wherein the wireline communication path extends from the client to an internet service provider;
processing the transmit request to generate first transmit instructions and second transmit instructions;
transmitting the first data set to the client over the wireline communication path based on the first transmit instructions; and establishing a wireless communication path with the client based on the second transmit instructions and transmitting the second data set to the client over the wireless communication path based on the second transmit instructions wherein the wireless communication path extends from the client to a cell site coupled to a mobile telephone switching office further coupled to the internet service provider.

2. The method of claim 1 further comprising transmitting the first data set to the client over the wireline communication path and transmitting the second data set to the client over the wireless communication path concurrently.

3. The method of claim 1 wherein processing the transmit request to generate the first transmit instructions and the second transmit instructions comprises processing the transmit request to select the wireless communication path for transmission of the second data set to the client based on quality of service.

4. The method of claim 1 wherein processing the transmit request to generate the first transmit instructions and the second transmit instructions comprises processing the transmit request to select the wireless communication path for transmission of the second data set to the client based on the size of the second data set.

5. The method of claim 1 further comprising generating a data request for the first data set and the second data set in response to receiving the transmit request, transmitting the data request to a network, and receiving the first data set and the second data set from the network in response to the data request.

6. The method of claim 1 wherein the second data set comprises a streaming video.

7. The method of claim 1 wherein the second data set comprises an Internet radio feed.

8. The method of claim 1 further comprising generating billing records based on transmissions over the wireline communication path and the wireless communication path.

9. The method of claim 1 further comprising storing configuration information for the client and processing the configuration information to generate the second transmit instructions.

10. A bandwidth boost system for use in a communication device, comprising:

a control system configured to receive a transmit request for a first data set and a second data set, process the transmit request to generate first transmit instructions and second transmit instructions, and transfer the first data set, the second data set, the first transmit instructions and the second transmit instructions;

a wireline transfer system configured to receive the transmit request from a client over a wireline communication path, transfer the transmit request to the control system, receive the first data set and the first transmit instructions from the control system, and transmit the first data set to the client over the wireline communication path based on the first transmit instructions wherein the wireline communication path extends from the client to an internet service provider; and a wireless transfer system configured to receive the second data set and the second transmit instructions from the control system, establish a wireless communication path with the client based on the second transmit instructions, and transmit the second data set to the client over the wireless communication path based on the second transmit instructions wherein the wireless communication path extends from the client to a cell site coupled to a mobile telephone switching office further coupled to the internet service provider.

11. The bandwidth boost system of claim 10 wherein the wireline transfer system is configured to transmit the first data set to the client over the wireline communication path concurrently as the wireless transfer system transmits the second data set to the client over the wireless communication path.

12. The bandwidth boost system of claim 10 wherein the control system is further configured to process the transmit request to select the wireless communication path for transmission of the second data set to the client based on quality of service.

13. The bandwidth boost system of claim 10 wherein the control system is further configured to process the transmit request to select the wireless communication path for transmission of the second data set to the client based on the size of the second data set.

14. The bandwidth boost system of claim 10 wherein the control system is further configured to generate a data request for the first data set and the second data set in response to receiving the transmit request, transmit the data request to a network, and receive the first data set and the second data set from the network in response to the data request.

15. The bandwidth boost system of claim 10 wherein the second data set comprises a streaming video.

16. The bandwidth boost system of claim 10 wherein the second data set comprises an Internet radio feed.

17. The bandwidth boost system of claim 10 wherein the control system is further configured to generate billing records based on transmissions over the wireline communication path and the wireless communication path.

18. The bandwidth boost system of claim 10 wherein the control system is further configured to store configuration information for the client and process the configuration information to generate the second transmit instructions.

* * * * *